United States Patent Office 2,904,240
Patented Sept. 15, 1959

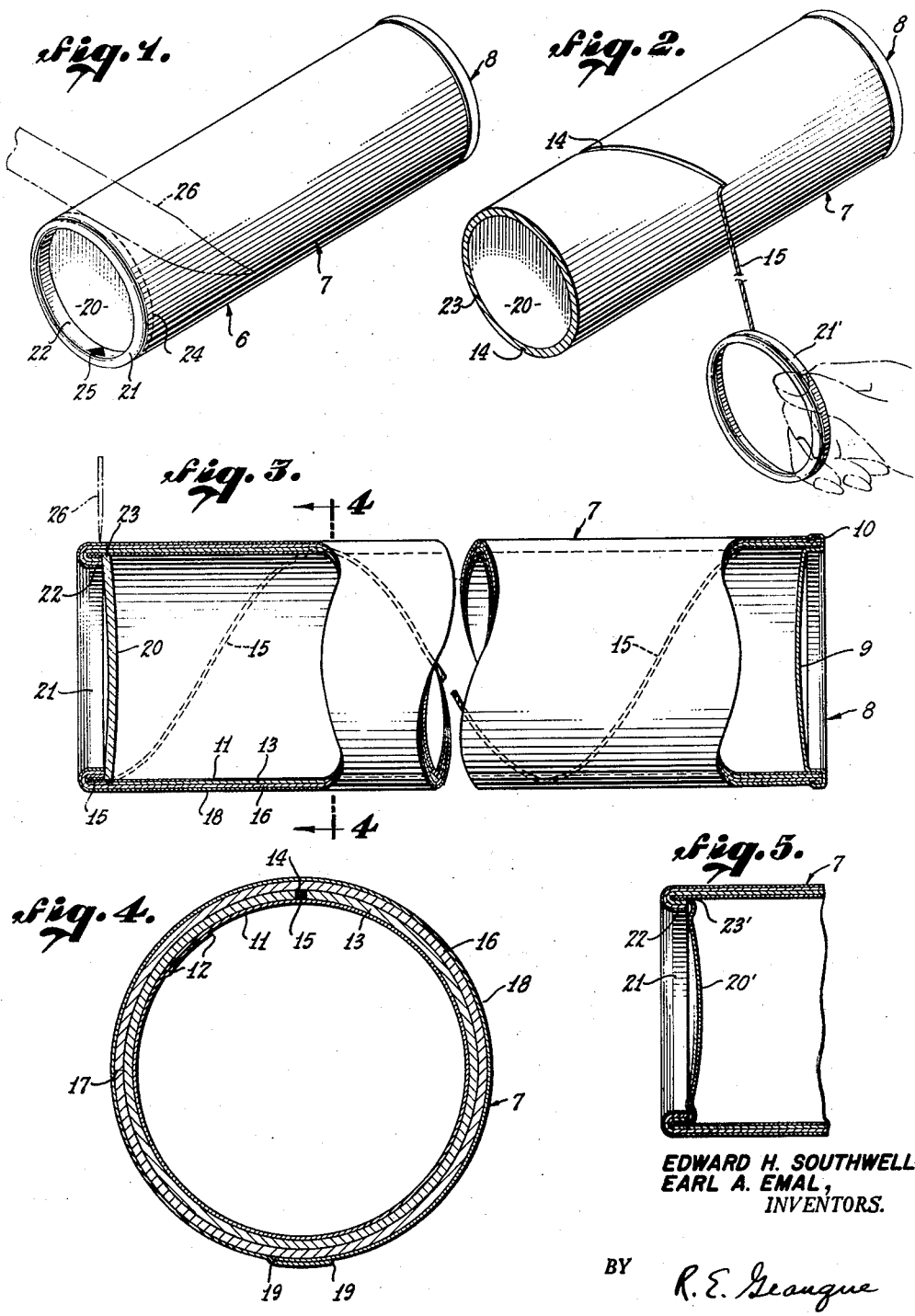

2,904,240

EASY OPENING AIR-TIGHT CONTAINER

Edward H. Southwell, Los Angeles, and Earl A. Emal, Lakewood, Calif., assignors to E. H. Southwell Company, Los Angeles, Calif., a corporation of California Application October 14, 1955, Serial No. 540,561

11 Claims. (Cl. 229—51)

This invention relates to an easy opening, air-tight container and more particularly to a ocntainer in which articles can be safely packed under pressure or in which pressure can safely develop after the articles are packed.

Containers of this type are utilized to pack biscuit dough and other similar food articles. At present, it is necessary to keep such containers for biscuit dough continually under refrigeration since otherwise, carbon dioxide gas will form because of the action of the yeast and cause excessive pressure within the containers. It is not uncommon for high pressure to build up prior to use of the biscuit dough since the containers are not maintained under refrigeration during transportation and storage by the purchaser. When the pressure exceeds the capacity of the container, the container will explode, either by blowing off the end of the container or by rupturing the side of the container causing the biscuit dough to extrude through the side in ribbon form.

Present types of containers are fabricated of paper or suitable material which is either convolute wound or spiral wound. The convolute type has the disadvantage that the container will fail by the end blowing off and such faliure represents a considerable hazard. Also, after the container fails, it is very difficult to remove the biscuit dough since the dough will expand against the side of the container and the container must be cut, rather than unwound, in order to remove the contents. Even when failure of the container does not occur, the dough is removed by cutting off the end of the container with a knife and dough will ribbon through the initial opening before the complete cut can be made so that the dough will not be removed in the biscuit form. In the spiral wound type of containers, the label is connected with a small band of paper which is peeled down to the last heavy ply and the inner aluminum ply. Thereafter, the container is broken by striking the container in order to break the container and permit the container to be torn away from the dough. At the time the band of paper is unwound, the container is considerably weakened and if an internal high pressure exists, the container will fail and dough will ribbon out through the side of the container.

By the present invention, it is possible to remove the biscuit dough in the form packed without the ribbon effect, which results when the container is initially broken by cutting the container or striking the container. A novel construction is utilized which permits quick removal of one end of the container upon initial deformation of the container. This container is constructed of a plurality of a laminated layers which are spiral wound and the edges of the layers are staggered around the circumference of the container to make the container airtight. A pull cord is positioned between the abutting edges of one of the inner layers and follows the same spiral contour as the abutting edges so that the cord can be pulled through the outer layers in order to break these layers in a spiral form without damage to the inner layers. One end of the container receives a rigid end closure while the other end of the contained is folded over upon itself to form a double-layer end portion. This other end is closed by a dome-shaped disc or end wall which is inserted into the container prior to the formation of the folded end. The edge of the dome-shaped disc will be held by the folded end of the container and pressure within the container will tend to straighten out the dome-shaped disc and thus force the edge of the disc against the wall of the container to maintain the container airtight. The pull cord is also folded over with the end of the container and the folded end, exterior of the disc, is cut off with a knife except for the portion containing the pull cord so that the end serves as a pull ring for the pull cord. During the cutting operation the knife will hold the end wall in position and the first initial pull on the pull ring will break the side of the container to free the end wall and permit the dough to be removed in proper form. Thereafter, the pull cord will be unwound to tear the outer layers of the container while the innermost layer will remain intact. Of course, the container can be broken completely away from the dough by simply twisting the container to break the inner layer. The novel manner in which the pull ring is formed permits the container to be easily and quickly opened, regardless of whether or not pressure exists within the container.

It is therefore an object of the present invention to provide an easy opening, air-tight container in which an end wall of the container can be easily removed as a unit.

Another object of the invention is to provide a laminated, spiral wound container in which a pull cord is located at the abutment of one of the inner plies and a pull ring is provided for the pull cord by folding over one end of the container and then severing the folded end except for the portion containing the pull cord.

A further object of the present invention is to provide a novel container for biscuit dough and the like in which one end wall of the container can be removed as a unit to prevent the extrusion of dough in ribbon form.

These and other objects of the invention not specifically set forth above will become readily apparent from the accompanying description and drawings in which:

Figure 1 is a perspective view of the container of the present invention illustrating the cut line for the folded end of the container and the marked portion containing the end of the pull cord.

Figure 2 is a perspective view of the container of Figure 1 after the folded end of the container has been removed to provide a pull ring for the pull cord.

Figure 3 is a vertical section through the container of Figure 1 showing the laminated construction of the container, the folded end of the container and spiral path of the pull cord.

Figure 4 is an enlarged vertical section along line 4—4 of Figure 3 illustrating the various layers of the container and the manner in which the pull cord is positioned between abutting edges of one layer.

Figure 5 is a vertical section similar to Figure 3 showing a modification of the end wall for the container.

Referring to Figure 1, the container 6 of the present invention is cylindrical in shape and has side wall 7 constructed of laminations of suitable material. One end of the container is permanently closed after packing of the container by an end closure 8 which has a dome-shaped end 9 and a channel-shaped section 10 clamped to the end of side wall 7. The end closure 8 is of standard construction and can be applied to the container with any suitable well-known equipment. The laminated layers of the side wall 7, as illustrated in Figure 4, comprise an inner layer 11 of material which will not react with the contents of the container and edges 12 of this inner layer are overlapped. For instance, the inner layer 11 can consist of bond paper of .003 inch thickness which is faced with aluminum foil of .00035 inch thickness. The next layer 13 consists of a heavier material, such as jute of .016 inch thickness, and the abutting ends of this layer are spaced apart to form an opening 14 for the pull cord 15. The next outer layer 16 also consists of a heavier layer of material, such as jute of .016 inch thickness, and the ends of this layer are positioned in abutment to form the abutment edge 17. The exterior of the container consists of an outer layer 18 of suitable material, such as .005 inch kraft, which carries the label for the container and the ends 19 of this outer layer are overlapped. As illustrated in Figure 4, the edges of all layers are staggered around the side of the container to strengthen the container and make the container air-tight. It is understood that the layers of the laminated side wall 7 are spiral wound and glued or otherwise permanently secured together and that the number, thickness and material of the layers can be varied to provide a container of desired strength and size. Since the pull cord 15 lies in the space 14 formed by the abutting ends of layer 13, the pull cord will follow a spiral path around the side wall 7 of the container, as illustrated in Figure 3, and when the cord 15 is unwound, it will leave the opening 14 and pull through layers 16 and 18 so that only inner layer 11 remains intact.

Referring again to Figure 3, the end of the container opposite end closure 8 is closed by a slightly dome-shaped end wall 20 which is forced into the container and bulges towards the interior of the container. End 21 of the side wall 7 is folded over and sealed to form a double thickness at the end of the container and the end edge 22 forms an abutment for holding the end wall 20 is the container. The end wall 20 is inserted and end 21 is folded over prior to filling of the container so that end closure 8 can be attached to the filled container by standard equipment. Since the cord 15 extends completely to the end edge 22, the cord will also be folded over along with the end 21 and will be rigidly held at end 21. The end wall 20 can be constructed of a suitable flexible material, such as cardboard, and edge 23 of the end wall will grasp the interior of the side wall 7 to form an air-tight seal. Since the end wall is dome-shaped in the direction of the interior of the container, any pressure within the container will tend to force the edge 23 of the end wall outwardly against the container wall 7 and thus maintain an efficient seal for the interior of the container.

Referring to Figure 1, a cut line 24 is drawn around the circumference of the wall 7 at a location such that the folded end of the container can be cut off by knife 26 without disturbing the position of the end wall 20. Also, a marker 25 is placed on the folded end 21 to designate the position of the end of the pull cord 15 within the folded end. Thus, by cutting along the line 24 until the knife reaches the marker 25, the folded end 21 will be severed from the wall 7 of the container, except for the portion containing the pull cord 15. During the time that the end 21 is being severed, the knife 26 will prevent the end wall 20 from moving out of the container. Thus, during the cutting of the folded end, there will be no tendency for the dough under pressure within the container to extrude in ribbons from the end of the container. It is understood that the edge 23 of end wall 20 forms the seal and edge 22 of end 21 holds the end wall in place prior to opening of the container.

After the cutting operation is completed, the end 21 forms pull ring 21' for applying a force to unwind pull cord 15. The initial pull on cord 15 will sufficiently deform the portion of side wall 7 adjacent the edge 23 of end wall 20 to permit the immediate removal of the end wall as a unit. Therefore, extrusion of the dough in ribbons is prevented since the container is not progressively opened. In the event the initial pull on the pull ring does not release the end wall, a slight twist on the cut end of the container will permit the release of the end wall. Thereafter, continued pull on the ring 21' will cause cord 15 to sever the layers 16 and 18, while leaving intact the inner layer 11. In the event it is desired to completely open the container, the side wall 7 can be twisted to sever the inner layer 11 along the spiral line of cord 15. A modification of end wall construction is illustrated in Figure 5. The dome-shaped end wall 20' is fabricated of a flexible metal material and has sharp edge 23' which grips the interior of the side wall to form an air-tight seal and hold the end wall 20' in the container. Pressure within the container will cause the edge 23' to further penetrate the side wall to retain the end wall 20' in the container and maintain the seal.

By the present invention, a novel container is provided in which the end wall can be removed as a unit by cutting off the end of the container and thereafter weakening the side wall. The cut-off end becomes a pull ring for a spiral wound pull cord which serves to partially sever the side wall along its complete length so that the container can be completely opened. Thus, when biscuit dough is packed in the container, the dough can be removed from the open end or by breaking the side wall without the extrusion of dough in ribbon form. When the dough expands against the side wall, the breaking of the side wall may be required to completely remove the contents. The container is equally suitable for the packaging of other articles, particularly those which must be maintained air-tight or under pressure. For instance, various machine parts can be packed in the container of the present invention and the inner layer could be free from the other layers so that the parts would be removed in the inner layer which would remain as a protective coating. The container also has the advantage that it can be safely opened, even when excessive interior pressures exist, because the container will necessarily open up at the folded end and this end can be pointed in a safe direction. Because of the manner in which the pull ring is formed, the container can be easily and quickly opened by the pull cord. It is understood that the container can be fabricated in any desirable cross section, such as square or oblong, and that the pull cord can be constructed of any suitable material, such as cordage, metal wire or plastic. Various other modifications of the invention are contemplated by those skilled in the art without departing from the spirit and scope of the invention as hereinafter defined by the appended claims.

What is claimed is:

1. A container comprising a wall member constructed of a plurality of spiral wound laminated layers, a spiral wound pull cord positioned between said laminated layers for severing at least one of said layers upon being unwound, one end of said wall member being folded over to form an abutting edge at the one end of the container, said pull cord being connected with said one folded end, an end member abutting said edge and closing the end of said container, and a pull ring for said pull cord formed by severing said folded end from said wall member outwardly of said end member.

2. A container as defined in claim 1 wherein said pull cord is folded over with said one end, a cut mark on said wall member outwardly of said end member for indicating the location for severing said one folded end to form said pull ring, and an indicator for indicating the position of said cord in said folded end so that said folded end can be severed from said wall member along said cut mark without severing said cord.

3. A container as defined in claim 1 wherein said pull cord is positioned in a space between abutting edges of one of said inner layers, the edges of all said layers being staggered around the circumference of said wall member.

4. A container as defined in claim 1 wherein the edge of said end member grips the interior of the container, said end member being dome-shaped so that pressure within the container will force the edge of said end member against the interior surface of said wall member to maintain a tight seal.

5. A container comprising a circular body member having a pull cord spirally embedded therein and extending to one end thereof, a circular dome-shaped end wall positioned within said one end of said body member with the edge of said end wall gripping the interior of said body member, an abutment edge for said end wall formed by folding said one end containing said pull cord after positioning of said end wall, and before filling of said container, a closure member attached to the other end of said container after filling of the container, and a pull ring for said pull cord formed by severing said folded end from said body member except for the portion containing said pull cord, the initial movement of said pull cord serving to release said end wall and further movement serving to partially sever the body member along a spiral path.

6. A container for packing biscuit dough or similar materials comprising a wall member having a pull cord embedded therein, end closure means for closing one end of said wall member, an end member inserted in the other end of said wall member to close the other end of said container, said pull cord extending past said end member and towards said other end, an abutting edge for said end member formed by folding said other end of said wall member, indicating means on said other end outwardly of said end member to permit removal of said folded end from said wall member except at said pull cord, and a pull ring for said pull cord provided by such removal of said folded end, the initial movement of said pull cord by said pull ring serving to weaken said wall member at said end member so that said end member can be removed as a unit.

7. A container as defined in claim 6 wherein said indicating means comprises a linear configuration on said wall member defining a plane adjacent the outer surface of said end member to permit said wall member to be severed by a knife along said configuration and thereby prevent outward movement of said end member during severance.

8. A container as defined in claim 6 wherein said wall member is comprised of a plurality of spiral wound layers laminated together, one of said inner layers having its abutting ends spaced apart to form a space for said pull cord.

9. A container as defined in claim 6 wherein said wall member comprises a plurality of spirally wound layers laminated together, the layer next to the inner layer having its edges spaced apart to form a space for said pull cord so that movement of said pull cord will separate all layers except the inner layer and permit said wall member to be easily opened along the spiral path of said pull cord.

10. A container as defined in claim 6 wherein said member is dome-shaped inwardly towards the center of the container so that pressure developed in the container will force the edge of the end member against said wall member.

11. A container as defined in claim 10 wherein said end member is constructed of a flexible metal material having a sharp edge which is forced into said wall member by pressure developed within the container to maintain a pressure seal.

References Cited in the file of this patent

UNITED STATES PATENTS

| | | |
|---|---|---|
| 1,936,417 | Ware | Nov. 21, 1933 |
| 2,051,923 | Vogt | Aug. 25, 1936 |
| 2,217,619 | Gazette | Oct. 8, 1940 |
| 2,314,338 | Graves et al. | Mar. 23, 1943 |

FOREIGN PATENTS

| | | |
|---|---|---|
| 613,587 | Great Britain | Nov. 30, 1948 |